(12) United States Patent
Kim (10) Patent No.: US 7,970,416 B2
(45) Date of Patent: Jun. 28, 2011

(54) BROADCASTING CHANNEL HANDOVER IN MOBILE COMMUNICATION TERMINAL

(75) Inventor: Ha-Yun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 316 days.

(21) Appl. No.: 11/283,128

(22) Filed: Nov. 18, 2005

(65) Prior Publication Data

US 2006/0111109 A1 May 25, 2006

(30) Foreign Application Priority Data

Nov. 19, 2004 (KR) .................. 10-2004-0095225

(51) Int. Cl.
*H04W 24/00* (2009.01)

(52) U.S. Cl. ............... 455/456.3; 455/456.1; 455/404.2; 455/414.2; 455/432.1; 455/440; 455/412.2; 455/403; 455/422.1

(58) Field of Classification Search .................. 455/436, 455/428, 435.2, 444, 438, 450, 456.1, 452.2, 455/404.2, 414.2, 432.1, 440, 412.2, 403, 455/456.3, 422.1
See application file for complete search history.

(56) References Cited

U.S. PATENT DOCUMENTS

| | | | |
|---|---|---|---|
| 6,169,894 B1 * | 1/2001 | McCormick et al. ...... 455/414.1 |
| 6,597,922 B1 * | 7/2003 | Ling et al. .................... 455/522 |
| 6,745,028 B1 * | 6/2004 | Hutchinson .................. 455/427 |
| 6,845,238 B1 * | 1/2005 | Muller ......................... 455/436 |
| 6,898,515 B2 * | 5/2005 | Kim et al. .................... 701/201 |
| 7,171,216 B1 * | 1/2007 | Choksi ....................... 455/456.1 |
| 7,296,091 B1 * | 11/2007 | Dutta et al. ................... 709/245 |
| 2002/0072371 A1 * | 6/2002 | Hokkanen ................... 455/438 |
| 2002/0082044 A1 * | 6/2002 | Davenport .................... 455/552 |
| 2003/0009576 A1 * | 1/2003 | Apostolopoulos et al. ... 709/231 |
| 2003/0009589 A1 * | 1/2003 | Apostolopoulos et al. ... 709/239 |
| 2003/0100325 A1 * | 5/2003 | Paila et al. .................... 455/506 |
| 2003/0134622 A1 | 7/2003 | Hsu |
| 2005/0026614 A1 * | 2/2005 | Otsuka et al. ................. 455/436 |

FOREIGN PATENT DOCUMENTS

| | | |
|---|---|---|
| EP | 1 133 089 A2 | 9/2001 |
| JP | 2001053635 A | 2/2001 |
| JP | 2002027519 A | 1/2002 |
| JP | 2002199428 | 7/2002 |
| JP | 2002330470 | 11/2002 |
| JP | 2003174376 | 6/2003 |
| JP | 2003309485 | 10/2003 |

* cited by examiner

*Primary Examiner* — Kwasi Karikari
(74) *Attorney, Agent, or Firm* — Lee, Hong, Degerman, Kang & Waimey (57) ABSTRACT

A mobile communication terminal for receiving a multimedia broadcast signal comprises a controlling unit adapted to extract channel information associated with a first mobile communication terminal location from a signal at the first mobile communication terminal location. The mobile communication terminal also comprises a comparing unit adapted to compare extracted channel information associated with the first mobile communication terminal location against channel information associated with a second mobile communication terminal location in response to movement of the mobile communication terminal from the first mobile communication terminal location to the second mobile communication terminal location. The mobile communication terminal may further comprise a memory adapted to store channel information received from a base station and a broadcasting network.

12 Claims, 6 Drawing Sheets

| | | | | | | | | |
|---|---|---|---|---|---|---|---|---|
| BROADCASTING CHANNEL INFORMATION ACCORDING TO AREA | | | | | | | | |
| POSINFO (SEOUL) | FREQ NO (12) | EID | EL | SID 1 | SL 1 | PD | PS | TMID | SUB CHID |
| POSINFO (DAEJEON) | FREQ NO (8) | EID | EL | SID 2 | SL 1 | PD | PS | TMID | SUB CHID |
| POSINFO (BUSAN) | FREQ NO (10) | EID | EL | SID 3 | SL 1 | PD | PS | TMID | SUB CHID |
| POSINFO (INCHEON) | FREQ NO (7) | EID 2 | EL | SID 1 | SL 1 | PD | PS | TMID | SUB CHID |

POSINFO : POSITION INFORMATION- SUSTAIN POSITION INFORMATION
FREQ NO : FREQUENCY NUMBER- FREQUENCY INFORMATION
EID : ENSEMBLE ID,   EL : ENSEMBLE LABEL
SID : SERVICE ID,   SL : SERVICE LABEL
PD : FACTOR FOR CLASSIFYING PROGRAM OR DATA SERVICE
PS : FACTOR FOR CLASSIFYING PRIMARY SERVICE OR SECONDARY SERVICE
TMID : TRANSPORT MECHANISM ID-CLASSIFY TRANSMISSION MODE
SUBCHID : SUB CHANNEL ID

BROADCASTING CHANNEL HANDOVER IN MOBILE COMMUNICATION TERMINAL

CROSS-REFERENCE TO RELATED APPLICATIONS

Pursuant to 35 U.S.C. §119(a), this application claims the benefit of earlier filing date and right of priority to Korean Application No. 95225/2004, filed on Nov. 19, 2004 the contents of which are hereby incorporated by reference herein in their entirety

FIELD OF THE INVENTION

The present invention relates to a mobile communication terminal, and more particularly, to a mobile communication terminal for performing a broadcasting channel handover.

BACKGROUND OF THE INVENTION

A mobile communication terminal may support multimedia broadcasting, such as digital multimedia broadcasting (DMB), digital video broadcasting (DVB-H), and media-forward link only (MEDIA-FLO). The DMB is a broadcasting service for providing digital multimedia signals, such as voice data and image data of high quality, to a personal digital assistant (PDA), a vehicle, or a mobile communication terminal having a DMB receiver. The DMB may be of a terrestrial DMB type or a satellite DMB type, based on how the signal waves are transmitted.

In satellite DMB, a terrestrial repeater station receives digital broadcasting data transmitted from a satellite and transmits the data to a satellite digital multimedia terminal. Therefore, the same broadcasting service may be performed through a single channel (or a single frequency). However, in terrestrial DMB, a broadcasting network is comprised of DMB local broadcasting networks, whereby each local station service broadcasting network manages a unique channel, and thus, a single frequency network (SFN) for performing the same broadcasting service through a single channel may not be easily implemented.

When a user of the mobile communication terminal moves while viewing a broadcast service provided from a specific DMB local broadcasting network, if the DMB local broadcasting network is changed, a channel served by the changed DMB local network must be searched and channel switching must be performed so that the user may continuously view the original broadcast.

SUMMARY OF THE INVENTION

Accordingly, the present invention is directed to broadcasting channel handover in a mobile communication terminal that substantially obviates one or more problems due to limitations and disadvantages of the related art.

An object of the present invention is to provide for performing a handover to a switched channel when a broadcasting channel is changed due to movement (e.g., roaming) of a mobile communication terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a mobile communication terminal configured for receiving a multimedia broadcast signal comprises a controlling unit adapted to determine location of the mobile communication terminal; the controlling unit further adapted to extract broadcast channel information associated with a first mobile communication terminal location; and a comparing unit adapted to compare extracted broadcast channel information associated with the first mobile communication terminal location against broadcast channel information associated with a second mobile communication terminal location in response to movement of the mobile communication terminal from the first mobile communication terminal location to the second mobile communication terminal location. Preferable, the broadcast channel information comprises ensemble channel information in an EID field of a channel information list and broadcasting service information in an SID field of the channel information list.

The mobile communication terminal further comprises a memory adapted to store broadcast channel information received from a broadcasting station. Preferably, the broadcast channel information is obtained from a broadcast signal from a broadcast station, and the location of the mobile communication terminal is determined from information received from one of a base station and a GPS.

According to one aspect of the invention, the controlling unit switches to a different frequency range to maintain reception of a broadcasting channel as the mobile communication terminal moves from the first mobile communication terminal location to the second mobile communication terminal location if the channel information associated with the broadcasting channel in the first mobile communication terminal location differs from the channel information associated with the broadcasting channel in the second mobile communication terminal location. The controlling unit calculates the first mobile communication terminal location and the second mobile communication terminal location using base station position information. The controlling unit also determines a position of a broadcast station from the broadcast channel information. Preferably, the controlling unit performs switching to the different frequency range based on determination of the comparing unit. In addition, the comparing unit determines whether to switch to the different frequency range based on the mobile communication terminal location and the position of the broadcast station.

According to another aspect of the invention, the location information is provided through a paging channel received from the base station. The paging channel comprises information associated with a longitude value and a latitude value of the base station.

According to another embodiment of the invention, a method for receiving a multimedia broadcast signal at a mobile communication terminal comprises determining location of the mobile communication terminal; extracting broadcast channel information associated with a first mobile communication terminal location; and comparing extracted broadcast channel information associated with the first mobile communication terminal location against broadcast channel information associated with a second mobile communication terminal location in response to movement of the mobile communication terminal from the first mobile communication terminal location to the second mobile communication terminal location. The method further comprises performing a handover to maintain reception of a broadcasting channel as the mobile communication terminal moves from the first mobile communication terminal location to the second mobile communication terminal location if the channel information associated with the broadcasting channel in the first mobile communication terminal location differs from the channel information associated with the broadcasting channel in the second mobile communication terminal location.

According to one aspect of the invention, the extracting comprises extracting broadcasting channel information associated with the first mobile communication terminal location; selecting a channel based on the broadcasting channel information associated with the first mobile communication terminal location; obtaining position information of a base station; monitoring the position of the mobile communication terminal within a broadcasting network using the position information of the base station; and extracting broadcasting channel information associated with the second mobile communication terminal location in response to the mobile communication terminal entering a handover area.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The present invention may be implemented in conjunction with various multimedia broadcast technologies, such as digital multimedia broadcasting (DMB) systems. Such DMB systems include terrestrial digital multimedia broadcasting (TDMB) systems and satellite digital multimedia broadcasting (SDMB) systems. The present invention may also be implemented in communication systems operating according to other standards, such as digital video broadcasting handheld (DVB-H), and/or media-forward link (MEDIA-FLO) systems. The digital multimedia terminal described herein is a portable multimedia receiver that may be implemented as a stand alone unit (such as in an automobile), or may be incorporated into a mobile communication terminal, a PDA (personal digital assistant), or a notebook computer, for example. The digital multimedia terminal may be an integrated component or an add-on module to the above devices. Although the terms DMB and 'digital multimedia terminal' are used to describe the invention below, any type of mobile multimedia terminal and supporting technology may be used.

The present invention may reduce the number of operations that the user must perform to receive multimedia, such as channel searching and channel switching when changing a channel frequency, by performing a handover of a broadcasting channel currently being served by using position information of a DMB broadcast station provided from a cellular mobile communications network and DMB broadcasting channel information according to each area provided from a DMB broadcasting network. This may be performed even if the user moves to a DMB local network using a different frequency channel. To implement the present invention, the position information of a base station and DMB broadcasting channel information according to each area may be needed. The position information for a DMB broadcast station may also be needed by the digital multimedia terminal.

The position information of each base station may include a longitude value and a latitude value of the base station in a cellular mobile communications network. The position information may be periodically obtained through a system parameter message of a paging channel transmitted from a base station. Alternatively, instead of the base station location, the location of each digital multimedia terminal that is in communication with the base station may be used for position information. The digital multimedia terminal location may be determined by using information from multiple base stations and such methods as angle of arrival or time difference of arrival. Alternatively, a GPS (global positioning system) method may be used.

In the description below, the cities of Seoul and Daejon are used only as examples. It shall be understood that the invention may be performed in any cities or areas, such as New York and Los Angeles, or any other cities or areas. DMB broadcast stations locations may be obtained by the digital multimedia terminal to determine the location of a digital multimedia terminal with respect to a corresponding DMB broadcast station. For example, a digital multimedia terminal may determine the distance between a first broadcast station and the digital multimedia terminal and compare this distance against the distance between a second DMB broadcast station and the digital multimedia terminal. The digital multimedia terminal may then determine whether a handover is needed based on the distance comparison. Alternatively, signal strength of each respective DMB broadcast station may be measured by the digital multimedia terminal and may be used to determine whether a handover is needed.

The location information of corresponding DMB broadcast stations may be provided to the digital multimedia terminal through a cellular network (for example, the base station may provide the DMB broadcast station location information to the digital multimedia terminal). Alternatively, such location information may be provided to the digital multimedia terminal from the DMB broadcast station directly by including such information in DMB control data.

The DMB broadcasting channel information of each area refers to information including a service ID (SID), obtained by parsing multiplex configuration information (MCI) and service information (SI) by a fast information channel (FIC) that controls a DMB broadcasting stream. The MCI includes broadcasting channel information, and the SI includes information related to the service.

The DMB broadcasting channel information of each area may be included in a channel information list. The channel information list is provided from a DMB broadcasting station when the digital multimedia terminal is initially activated (e.g., turned on). The channel information list is then preferably stored in a memory within the digital multimedia terminal.

Figure 1:
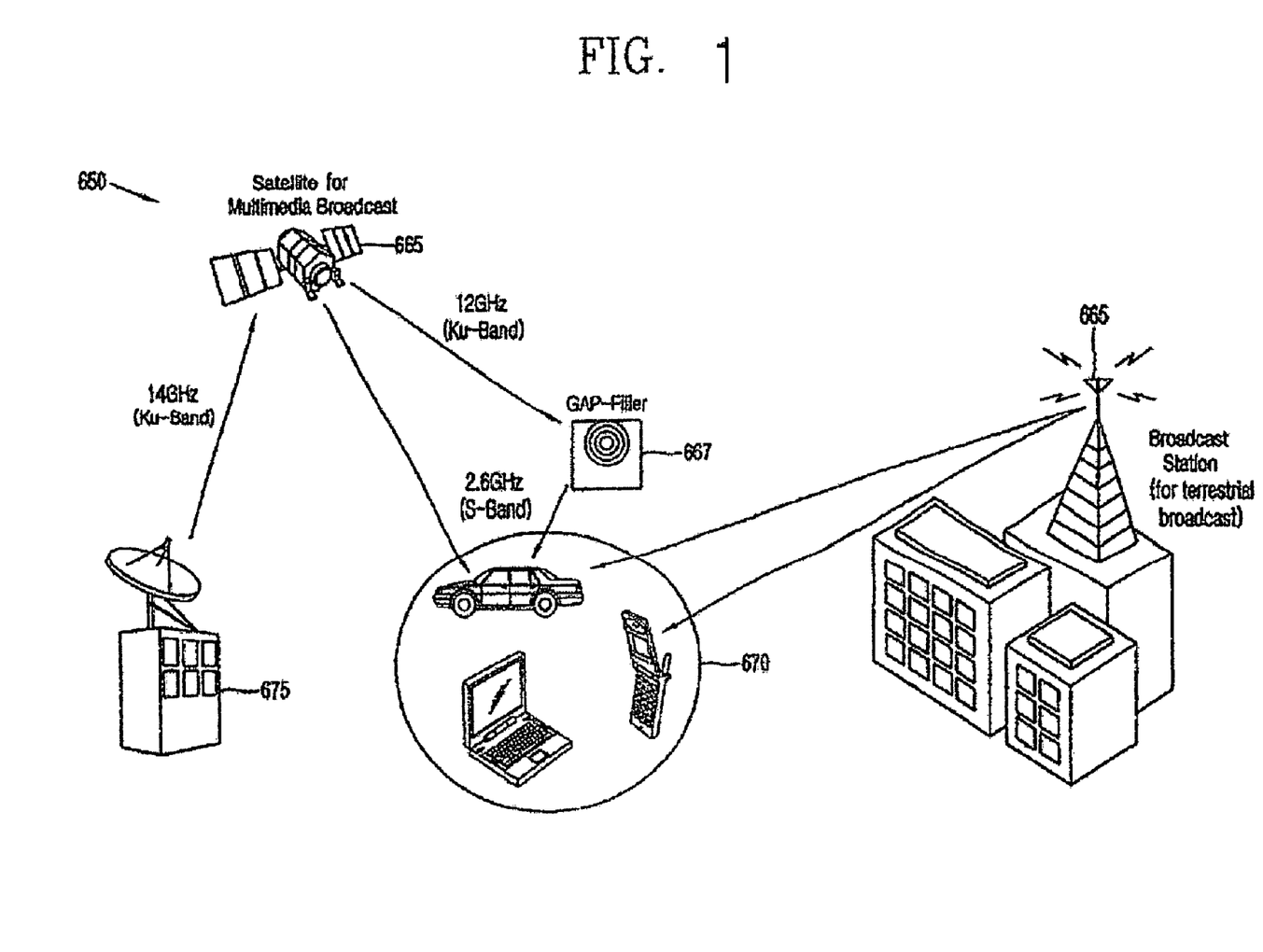
FIG. 1 is a diagram illustrating an overview of a digital multimedia broadcast system, according to an embodiment of the invention.

FIG. 1 is a diagram illustrating a multimedia broadcast system 650.

Figure 2A:
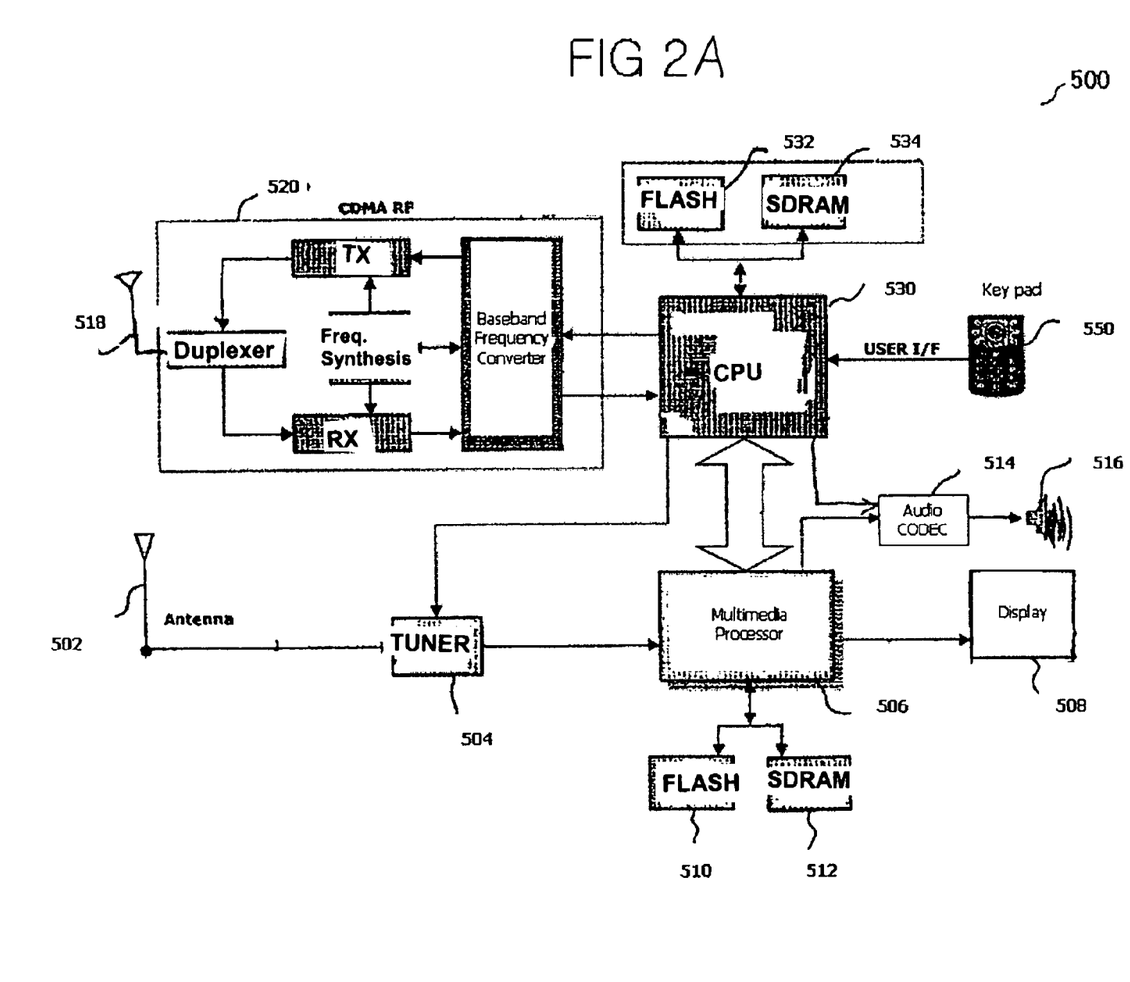
FIGS. 2A-2B are block diagrams illustrating a digital multimedia terminal for performing a broadcasting channel handover, according to embodiments of the present invention.

Referring to FIG. 1, a system overview is provided of a multimedia broadcast system 650. The multimedia broadcast system 650 includes a terrestrial broadcast station 655 for terrestrial broadcasts (e.g., TDMB broadcasts). The multimedia broadcast system 650 also includes a satellite broadcast station 665 for satellite broadcasts (e.g., SDMB broadcasts). The multimedia broadcast system 650 also includes a mobile multimedia terminal 670 for receiving the broadcasts from the terrestrial broadcast station 655 and/or the satellite broadcast station 665. The mobile multimedia terminal 670 may be embodied in an automobile, a mobile telephone, or a personal digital assistant (PDA), for example, as shown in FIG. 2A. The multimedia broadcast system 650 may also include a GAP filler 667 to enhance communication between the satellite broadcast station 665 and the mobile multimedia terminal 670, for example in 'weak signal' areas, and/or a terrestrial broadcast station 675 for communicating with the satellite broadcast station 665, such as to transmit a television signal to the satellite broadcast station 665 to enable satellite based broadcast of the television signal to mobile multimedia terminals.

Figure 2B:
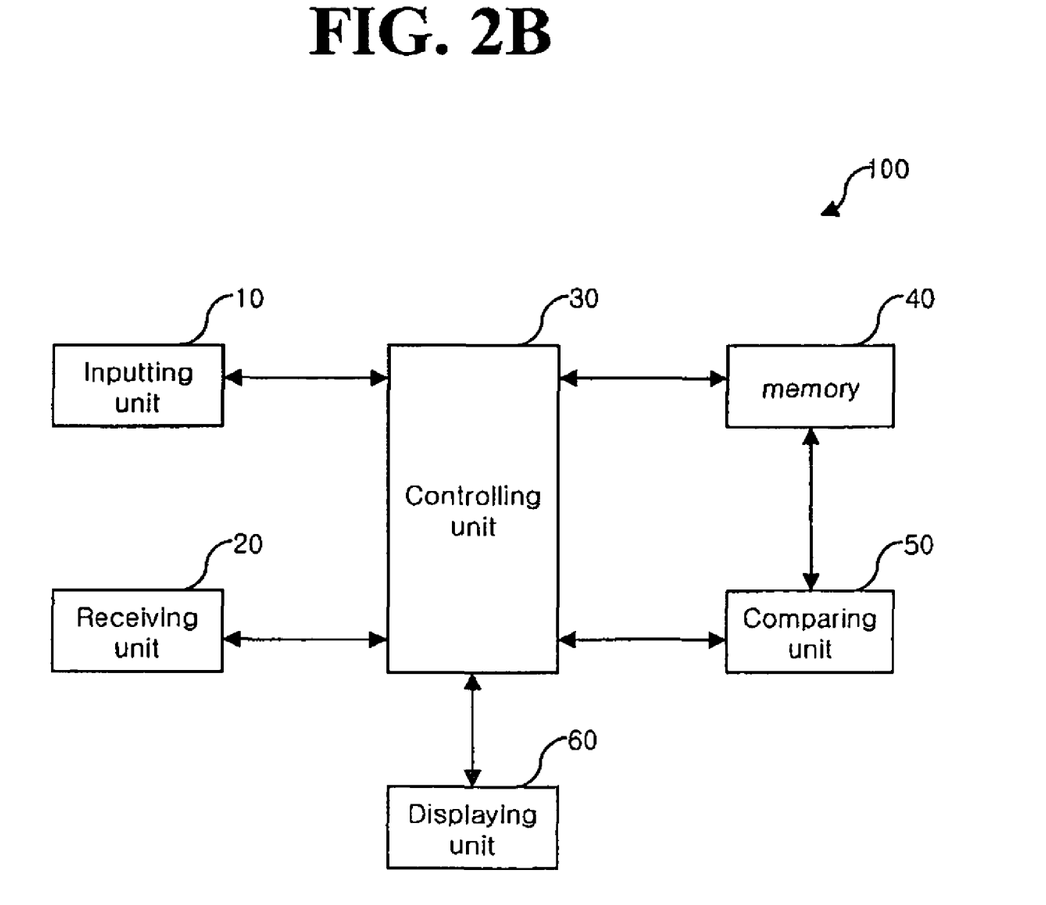

FIGS. 2A and 2B are block diagrams showing a digital multimedia terminal for performing a broadcasting channel handover for a mobile communication terminal, according to embodiments of the present invention. In particular, FIG. 2A illustrates a block diagram for a mobile communication terminal that combines a cellular telephone and a multimedia terminal for receiving DMB broadcast.

Referring to FIG. 2A, the mobile communication terminal 500 comprises one or more antennas 502, 504 for receiving radio frequency signals from a cellular base station and multimedia signals from broadcast station. A multimedia antenna 502 is operationally connected to a tuner 504 that may be connected to a code division multiplexing (CDM) demodulator. The output of the tuner 504 is operationally connected to a multimedia processor or controller 506 that performs necessary signal processing to display video images through a display 508 and/or output audio signals to a speaker 516 through an audio codec 514. The processor 506 is connected to flash memory 510 and RAM 512 for storing and retrieving data.

Further referring to a cellular section of FIG. 2A, a radio antenna 518 is operationally connected to an RF unit 520. The RF unit 520 may be configured to receive/transmit and process cdma and/or GSM signals. The output of the RF unit 520 is connected to a central processing unit 530 that processes data signals from and to the RF unit 520 and processes user interface data received from a keypad 550 or other input devices. The CPU 530 is connected to flash memory 532 and RAM 534 for storing and retrieving data. The CPU 530 and the multimedia processor 506 are operationally connected to each other to communicate processing data. Preferably, the multimedia processor 506 is designed for processing multimedia signals whereas the CPU 530 controls the entire operation of the mobile communication terminal 500. Although two separate flash memories and RAM are illustrated, they can be combined so that both CPU 530 and the multimedia processor 506 may retrieve/store the data in the same flash memory and RAM.

The invention is described below with reference to a simplified embodiment of a digital multimedia terminal, as depicted in FIG. 2B. Referring to FIG. 2B, the digital multimedia terminal 100 includes an inputting unit 10 for inputting a command such as a channel selection, etc., a controlling unit 30 for controlling an inputted command and calculating a current position using position information of each base station, a memory 40 for storing various data including a channel information list, a receiving unit 20 for receiving data such as a latitude value and/or a longitude value of each base station, a comparing unit 50 for comparing the calculated current position against a moved position to decide whether to perform a handover. The digital multimedia terminal 100 also includes a displaying unit 60.

When position information of a corresponding base station and local DMB channel information of a DMB network are received through the receiving unit 20, a channel information list, including the local DMB channel information, may be stored in a memory. When a channel to be viewed is selected from the channel information list stored in the memory by broadcasting channel information of a current area, the user may view the selected channel through the displaying unit 60.

While the user views the selected channel, if the mobile communication terminal is moved to another area, the mobile communication terminal receives a paging channel provided from a cellular mobile communication network. The paging channel contains position information of a base station, preferably including a longitude value and a latitude value from a system parameter message. After the position information has been received, the comparing unit 50 may calculate a current position (e.g., a position inside a first cell in FIG. 5) of the mobile communication terminal by the controlling unit 30. Accordingly, the comparing unit 50 detects where the mobile communication terminal is positioned in the DMB network, and monitors whether or not the mobile communication terminal is positioned in a service overlap region (e.g., third cell in FIG. 5).

If the mobile communication terminal is positioned in the service overlap region, the controlling unit extracts broadcasting channel information of an area overlapped with the current area and transmits the broadcasting channel information to the comparing unit 50. Then, the comparing unit 50 compares broadcasting channel information of the current area with broadcasting channel information of the moved (e.g., roamed) area, and decides whether to perform a handover based on the compared result.

Figure 3:
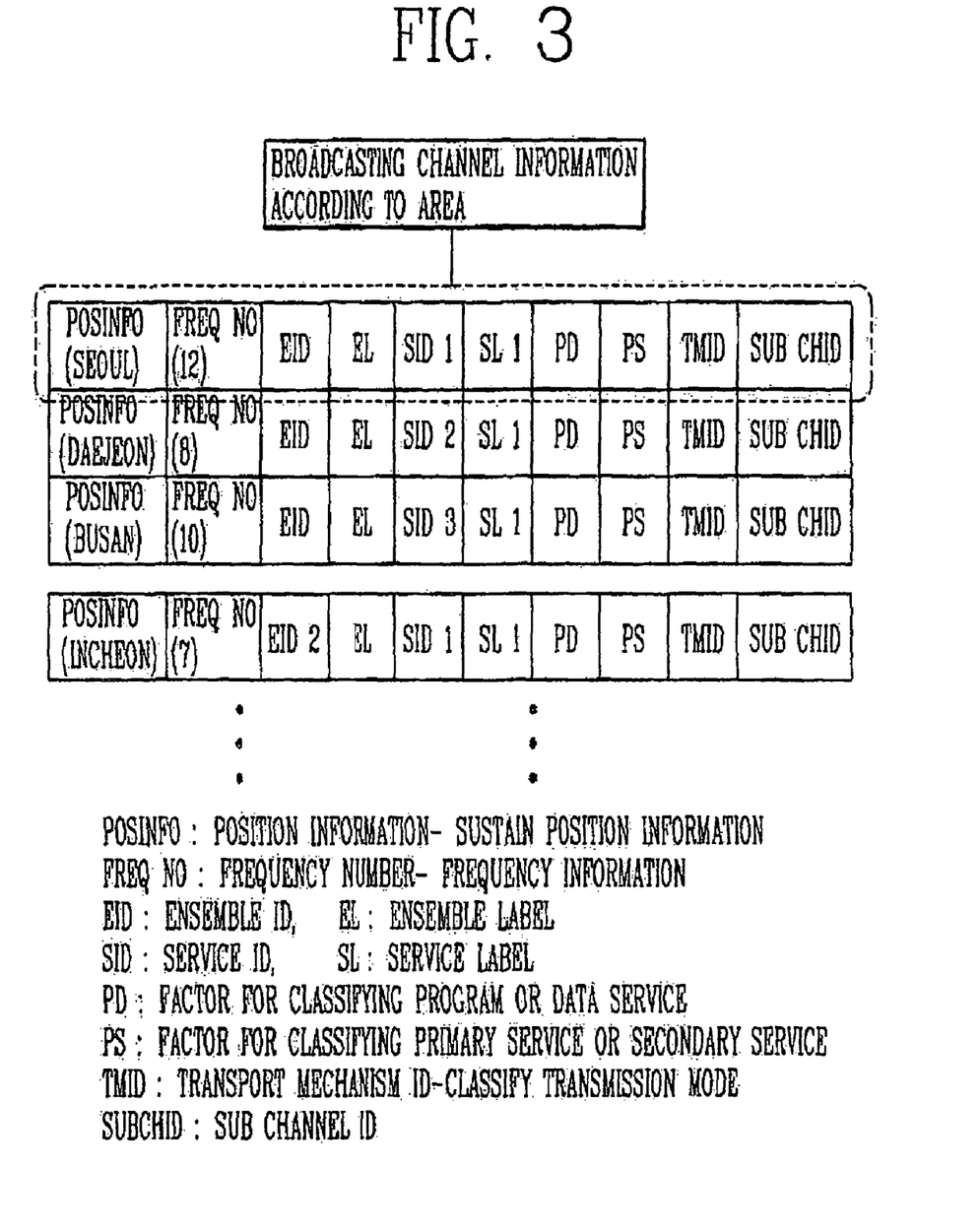
FIG. 3 is a diagram illustrating an exemplary channel information list, according to an embodiment of the present invention.

FIG. 3 is a diagram illustrating an exemplary channel information list, according to an embodiment of the present invention.

As illustrated in FIG. 3, the channel information list includes DMB broadcasting channel information of each area. The DMB broadcasting channel information of each area preferably comprises position information (e.g., PosInfo field), frequency information (e.g., FreqNo field), ensemble channel information (e.g., EID field), and broadcasting service information (e.g., SID field). The ensemble channel indicates a group of DMB broadcasting channels provided by a DMB broadcasting service provider. The EID includes the ensemble channel information. The channel information may be received from a broadcast station, pre-programmed in a mobile communication terminal, or provided by a cellular service provider using cellular radio signal.

Referring to FIG. 3, if a DMB local network is located in Seoul, then the number of frequencies allocated to the area is 12, and the frequency No. 12 includes ensemble channels (e.g., 12A-KBS, 12B-MBC, 12C-SBS, etc.) related to a plurality of DMB broadcasting service providers (e.g., KBS, MBC, SBS, etc.) in the EID. However, if the DMB local network is located in Daejeon, then the number of frequencies allocated to the area is 8, and the frequency No. 8 includes ensemble channels (e.g., 8B-KBS, 8A-MBC, 8C-SBS, etc.) allocated thereto.

Figure 4:
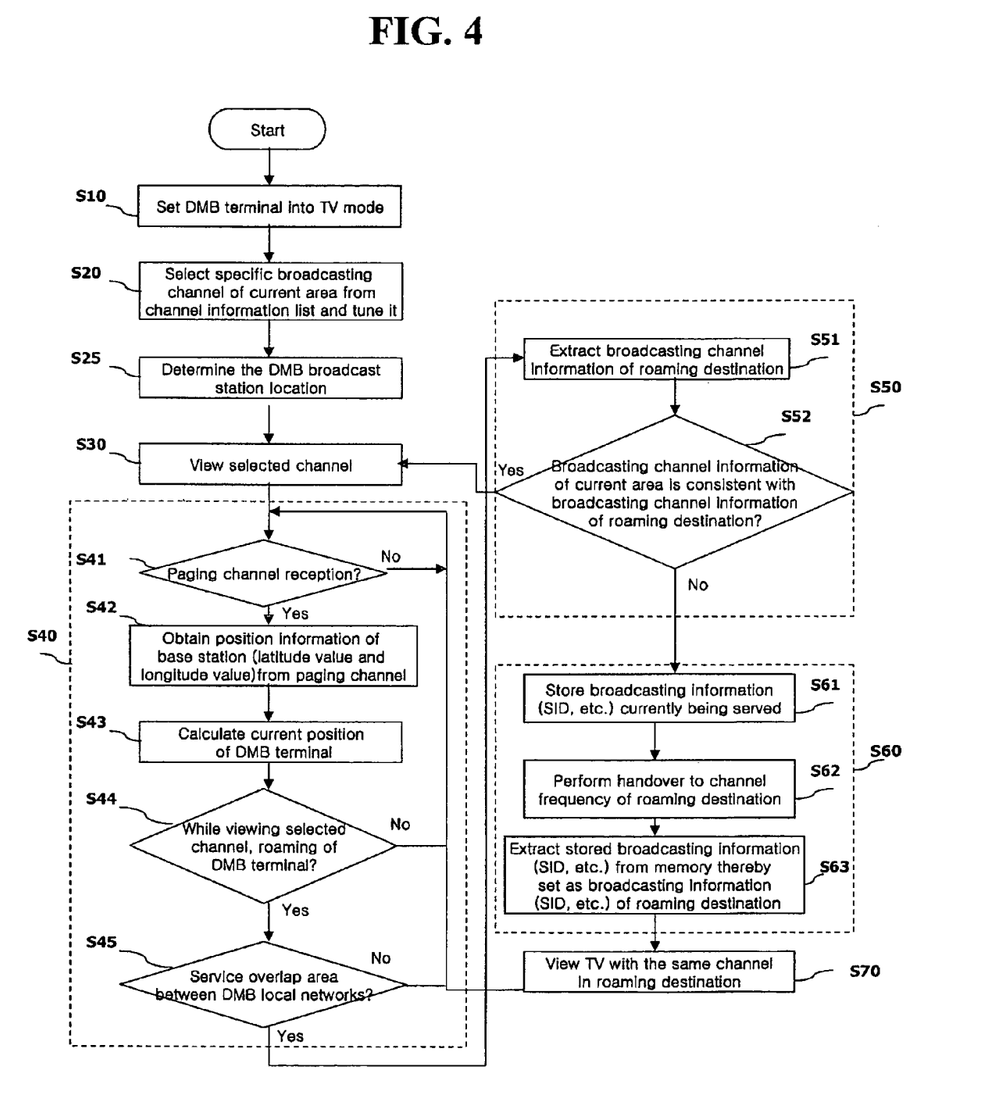
FIG. 4 is a flow diagram illustrating a broadcasting channel handover, according to an embodiment of the present invention.
Figure 5:
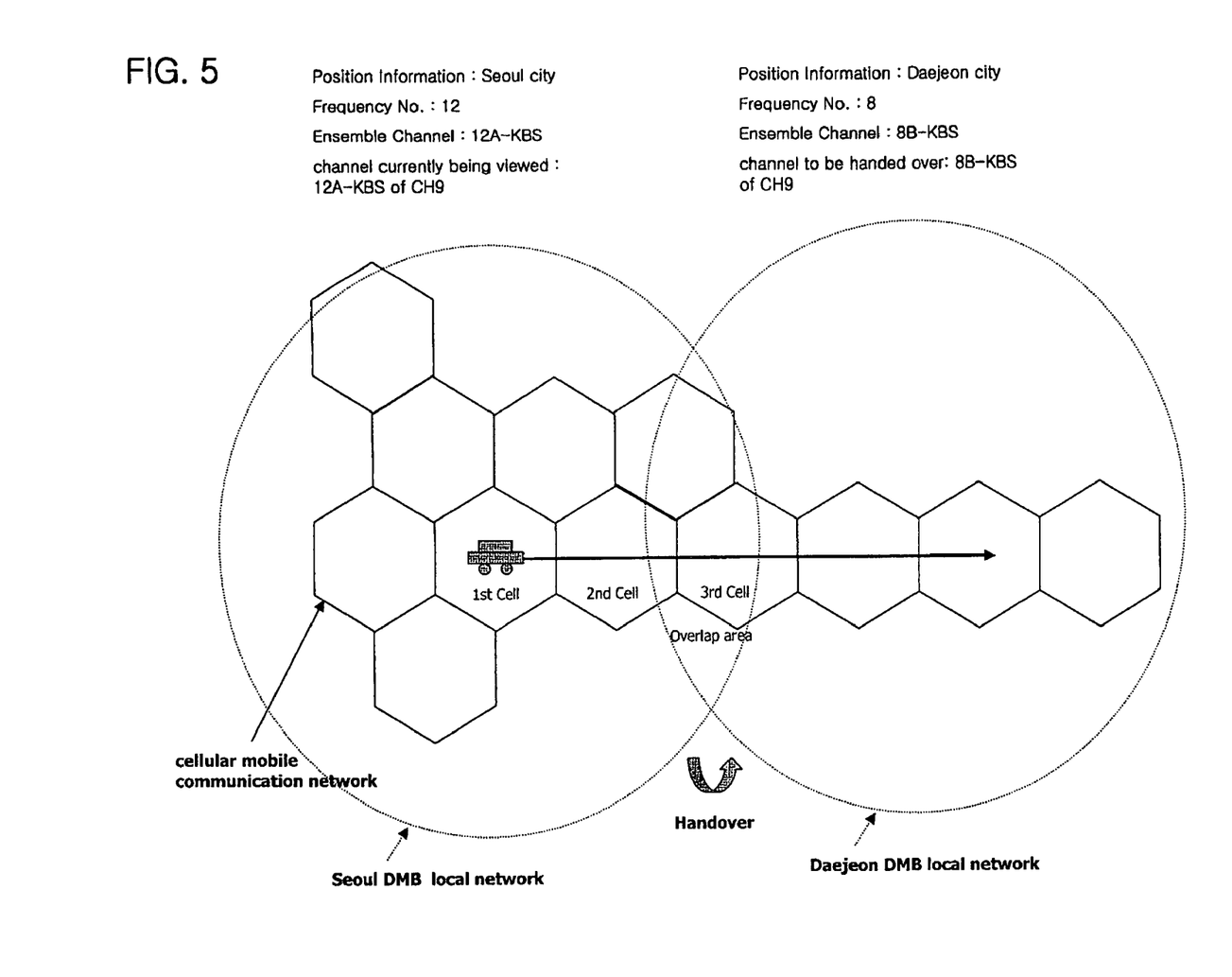
FIG. 5 is a diagram illustrating an exemplary broadcasting channel handover due to movement of a mobile communication terminal, according to an embodiment of the present invention.

FIG. 4 is a flow diagram illustrating a broadcasting channel handover, according to an embodiment of the present invention. FIG. 5 is a diagram illustrating an exemplary broadcasting channel handover due to movement of a mobile communication terminal, according to an embodiment of the present invention.

The process for performing a broadcasting channel handover by a mobile communication terminal is described below with reference to FIGS. 3-5. The user operates the digital multimedia terminal in a TV mode to receive a DMB broadcasting service (S10). The user then selects a desired channel (e.g., CH9) from a channel information list stored in a memory, which is obtained through broadcasting channel information related to the current area and views the selected channel (S20, S30). At step S25, the location of the DMB terminal is determined. The location of the DMB terminal may be determined by various locating methods, such as GPS (global positioning system), angle of arrival, or time difference of arrival.

Referring to FIGS. 4 and 5, if the user moves to another DMB local network from the current area while viewing the selected channel, the user's digital multimedia terminal searches for its the current position and monitors whether the user is located within an overlapped area between the DMB local networks (S40).

Step S40 is described in greater detail below. The digital multimedia terminal receives a paging channel provided from a cellular mobile communications network (S41), and obtains position information of a base station including a longitude value and a latitude value of each base station from a system parameter message of the paging channel (S42). Then, the digital multimedia terminal calculates the current position (e.g., the position of the first cell in FIG. 5) by using the obtained position information of the base station (S43), thereby searching the position of the digital multimedia terminal inside the DMB local network. Then, it is determined whether the user moves while the selected is being viewed (S44). If the user moves, the digital multimedia terminal monitors whether the user is located within a service overlap region (e.g., the third cell of FIG. 5) between the DMB local networks (S45).

In step S40, if the user's digital multimedia terminal is determined to be located in the overlapped area between the DMB local networks, the digital multimedia terminal extracts broadcasting channel information of the corresponding area that overlaps with the current area from the channel information list stored in the memory (S51). The digital multimedia terminal then checks whether broadcasting channel information of the current area is consistent with the broadcasting channel information of the roaming destination of the terminal (S52). The steps S51 and S52 are performed to determine whether to perform a broadcasting channel handover of the digital multimedia terminal (S50). Referring to FIG. 4, the comparison result in step S50 indicates that the extracted broadcasting channel information of the roaming area is different from that of the current area. That is, when the fields of each corresponding broadcasting channel information are compared, locally specific information differs.

As illustrated, the service frequency of Seoul (e.g., 12) is different from the service frequency of Daejeon (e.g., 8). Furthermore, an ensemble channel provided by a broadcasting provider in Seoul is 12A-KBS, for example, while an ensemble channel provided by a broadcasting provider in Daejeon is 8B-KBS, for example. Moreover, the SID information associated with Seoul differs from that of Daejeon. Therefore, a broadcasting channel handover is required so that the user may continuously view the current broadcasting channel (e.g., CH9 of 12A-KBS) while the user travels from Seoul to Daejeon.

As illustrated in FIG. 5, the digital multimedia terminal performs a handover for the broadcasting channel being served in Seoul (e.g., CH9 of 12A-KBS) to the same broadcasting channel (e.g., CH9 of 8B-KBS) provided by the roaming destination of the digital multimedia terminal, Daejeon, and updates the channel information list by the broadcasting channel information of the roaming destination of the digital multimedia terminal, Daejeon (S60).

The step S60 is now explained in more detail. Broadcasting channel information (e.g., EID, SID1, etc.) of the current broadcasting service area is stored in a memory provided within the digital multimedia terminal for backup (S61). Then, the channel frequency 12 of the current broadcasting service area (e.g., CH9 of 12A-KBS) is changed to the channel frequency 8 of the roaming destination of the terminal (e.g., CH9 of 8B-KBS), thereby performing a handover (S62). Then, the broadcasting channel information stored in the step S61 is extracted to be set as the broadcasting channel information (e.g., EID, SID2, etc.) of the switched area, to thereby update the broadcasting information (S63).

As the broadcasting channel currently being viewed by the user is handed over, the user may continuously view the same channel of the broadcasting station that was previously viewed, without performing any additional channel searching and channel controlling, even if the broadcasting channel information of the roaming destination of the terminal is different from that of the current area (S70).

In one embodiment, a mobile communication terminal for receiving a multimedia broadcast signal comprises a controlling unit adapted to extract channel information associated with a first mobile communication terminal location from a signal at the first mobile communication terminal location. The mobile communication terminal also comprises a comparing unit adapted to compare extracted channel information associated with the first mobile communication terminal location against channel information associated with a second mobile communication terminal location in response to movement of the mobile communication terminal from the first mobile communication terminal location to the second mobile communication terminal location.

The mobile communication terminal may further comprise a memory adapted to store channel information received from a base station and a broadcasting network. The controlling unit may switch to a different frequency range to maintain reception of a broadcasting channel as the mobile communication terminal moves from the first mobile communication terminal location to the second mobile communication terminal location if the channel information associated with the broadcasting channel in the first mobile communication terminal location differs from the channel information associated with the broadcasting channel in the second mobile communication terminal location. The controlling unit may calculate the first mobile communication terminal location and the second mobile communication terminal location using base station position information. The controlling unit may also calculate a position of a broadcast station in the broadcasting network using base station position information. The channel information may comprise a longitude value and a latitude value of a base station. The comparing unit may determine whether to switch to the different frequency range based on the mobile communication terminal location and the position of the broadcast station. The controlling unit may perform switching to the different frequency range based on determination of the comparing unit. The channel information may comprise ensemble channel information in an EID field of a channel information list and broadcasting service information in an SID field of the channel information list.

In another embodiment, a method for receiving a multimedia broadcast signal at a mobile communication terminal comprises extracting channel information associated with a first mobile communication terminal location from a signal at the first mobile communication terminal location. The method also comprises comparing extracted channel information against channel information associated with a second mobile communication terminal location in response to movement of the mobile communication terminal from the first mobile communication terminal location to the second mobile communication terminal location. The method also comprises performing a handover to maintain reception of a broadcasting channel as the mobile communication terminal moves from the first mobile communication terminal location to the second mobile communication terminal location if the channel information associated with the broadcasting channel in the first mobile communication terminal location differs from the channel information associated with the broadcasting channel in the second mobile communication terminal location.

The extracting may comprise extracting broadcasting channel information associated with the first mobile communication terminal location, and selecting a channel based on the broadcasting channel information associated with the first mobile communication terminal location. The extracting may also comprise obtaining position information of a base station, and monitoring the position of the mobile communication terminal within a broadcasting network using the position information of the base station. The extracting may also comprise extracting broadcasting channel information associated with the second mobile communication terminal location in response to the mobile communication terminal entering a handover area.

The method may further comprise determining whether to perform the handover based on a mobile communication terminal location and the position of the broadcast station. The method may further comprise performing the handover based on the determining whether to perform the handover based on the mobile communication terminal location and the position of the broadcast station. The channel information associated with the first mobile communication terminal location and the channel information associated with the second mobile communication terminal location may be extracted from a channel information list. The channel information list may be provided by a broadcast provider. The base station position information may be received via a system parameter message inside a paging channel provided by a cellular mobile communication network.

Accordingly, the present invention provides a wireless communication device including a transceiver to send and receive signals with a digital multimedia broadcasting network having multiple local broadcasting regions, a memory to store broadcasting channel information related to each local broadcasting region, and a processor cooperating with the transceiver and the memory to perform the steps of detecting entry into a current local broadcasting region from a previous local broadcasting region while a user is viewing contents provided via a first broadcasting channel of the previous local broadcasting region, comparing broadcasting channel information of the current local broadcasting region with that of the previous local broadcasting region, and selecting an appropriate broadcasting channel of the current local broadcasting region that corresponds to the first broadcasting channel to allow the user to continuously view the contents provided from the previous local broadcasting region after entering the current local broadcasting region.

The broadcasting channel handover method of a digital multimedia terminal according to the present invention is applied when the broadcasting channel information of a roaming destination of the mobile communication terminal is different from the broadcasting channel information of a current area. Therefore, when broadcasting channel information of the roaming destination of the mobile communication terminal is consistent with broadcasting channel information of the current area, the broadcasting channel handover need not be performed.

In the present invention, even if a channel served by a DMB local network is changed into a new channel as the user is mobile, the user may continuously view the broadcast currently being served without performing any additional channel searching or channel changing. Also, in the present invention, the position of the digital multimedia terminal is searched by a cellular mobile communications network, so that an additional position tracing device such as a global positioning system (GPS) may not be required, to further reduce costs. The present invention may be applied not only to a method for performing a handover between base stations, but also when a roaming is generated between satellites. The present invention may enable handovers of digital multimedia terminals to be performed using EID and SID fields of a channel information list, thereby reducing the need for channel searching by the user.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A mobile communication terminal configured for receiving a multimedia broadcast signal, comprising:
   an input unit configured to receive a channel selection input from a user for receiving a multimedia broadcast;
   a memory unit configured to store a channel broadcasting list including broadcasting channel information for broadcasting areas, the channel broadcasting list being provided by a broadcasting station when the mobile communication terminal is initially activated;
   a receiving unit configured to receive a multimedia broadcast signal from a broadcast station according to the channel selection input;
   a positioning unit for periodically determining the position of the mobile communication terminal;

a controlling unit configured to:
  determine a current broadcast area of the mobile communication terminal according to a determined position of the mobile communication terminal,
  extract a first broadcasting channel information for the multimedia broadcast signal associated with the current broadcast area,
  receive the multimedia broadcast signal corresponding to the channel selection input based on the extracted first broadcasting channel information of the current broadcast area,
  determine if the mobile communication terminal has moved from the current broadcast area according to the periodically determined position of the mobile communication terminal while receiving the multimedia broadcast signal associated with the channel selection input,
  determine, via the positioning unit, if the mobile communication terminal is located in an overlapped broadcast service area located between the current broadcast area and a second broadcast area when the mobile communication terminal has moved from the current broadcast area, and
  extract, from the memory unit, a second broadcasting channel information associated with the second broadcast area that overlaps the current broadcast area; and
a comparing unit configured to compare the extracted first broadcasting channel information with the extracted second broadcasting channel information,
wherein the controlling unit switches to a broadcasting channel of the second broadcast area that provides the same broadcasting signal as the current broadcast area when the first broadcasting channel information is different from the second broadcasting channel information, and
wherein the second broadcast area does not completely overlap the current broadcast area.

2. The mobile communication terminal of claim 1, wherein the position of the mobile communication is periodically determined from position information received from the broadcast station or a GPS unit.

3. The mobile communication terminal of claim 1, wherein the controlling unit determines a position of the broadcast station from the extracted first broadcasting channel information and the extracted second broadcasting channel information.

4. The mobile communication terminal of claim 1, wherein the periodically determined position of mobile communication terminal location information is detected via a paging channel received from the broadcast station.

5. The mobile communication terminal of claim 4, wherein the paging channel comprises information associated with a longitude value and a latitude value of the broadcast station.

6. The mobile communication terminal of claim 1, wherein the first and the second broadcasting channel information comprise ensemble channel information in an EID field of a channel information list and broadcast service information in an SID field of the channel information list.

7. A method for receiving a multimedia broadcast signal at a mobile communication terminal, the method comprising:
  storing a channel broadcasting list including broadcasting channel information for broadcasting areas, the channel broadcasting list being provided by a broadcasting station when the mobile communication terminal is initially activated;
  receiving a channel selection input from a user for receiving a multimedia broadcast;
  periodically determining a current broadcast area of the mobile communication terminal according to a received position of the mobile communication terminal;
  extracting a first broadcasting channel information for the multimedia broadcast signal associated with the current broadcast area;
  receiving a multimedia broadcast signal corresponding to the channel selection input based on the broadcasting channel information of the current broadcast area;
  determining if the mobile communication terminal has moved from the current broadcast area while receiving the multimedia broadcast signal associated with the channel selection input;
  determining if the mobile communication terminal is located in an overlapped broadcast service area located in an area which overlaps between the current broadcast area and a second broadcast area when the mobile communication terminal has moved from the current broadcast area;
  extracting, from the memory unit, a second broadcasting channel information associated with the second broadcast area that overlaps the current broadcast area;
  comparing the extracted first broadcasting channel information with the extracted second broadcasting channel information; and
  switching to a broadcasting channel of the second broadcast area that provides the same broadcasting signal as the current broadcast area when the extracted first broadcasting channel information is different from the extracted second broadcasting channel information, and
  wherein the second broadcast area does not completely overlap the current broadcast area.

8. The method of claim 7, wherein the current broadcast area and the second broadcast area are determined from position information received from the broadcast station or a GPS unit.

9. The method of claim 7, further comprising determining the current area and the overlapped area using position information of the broadcast station.

10. The method of claim 7 wherein a position of the broadcast station is determined via the extracted first broadcasting channel information and the extracted second broadcasting channel information.

11. The method of claim 7, wherein the current broadcast area and the second broadcast area are provided via a paging channel received from the base station.

12. The method of claim 11, wherein the paging channel comprises information associated with a longitude value and a latitude value of the broadcast station.

* * * * *